US012126959B2

(12) United States Patent
Wang et al.

(10) Patent No.: US 12,126,959 B2
(45) Date of Patent: Oct. 22, 2024

(54) DIAPHRAGM AND MEMS SENSOR USING SAME

(71) Applicant: AAC ACOUSTIC TECHNOLOGIES (SHENZHEN) CO., LTD., Shenzhen (CN)

(72) Inventors: Linlin Wang, Shenzhen (CN); Zhuanzhuan Zhao, Shenzhen (CN); Kaijie Wang, Shenzhen (CN); Zhengyu Shi, Shenzhen (CN); Minh Ngoc Nguyen, Bac Ninh (VN); Rui Zhang, Shenzhen (CN)

(73) Assignee: AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 242 days.

(21) Appl. No.: 17/970,585

(22) Filed: Oct. 21, 2022

(65) Prior Publication Data

US 2023/0353950 A1 Nov. 2, 2023

(30) Foreign Application Priority Data

Apr. 28, 2022 (CN) ......................... 202221018386.5

(51) Int. Cl.
*H04R 19/04* (2006.01)
*H04R 19/00* (2006.01)
*H04R 31/00* (2006.01)

(52) U.S. Cl.
CPC ........... *H04R 19/005* (2013.01); *H04R 19/04* (2013.01); *H04R 31/003* (2013.01)

(58) Field of Classification Search
CPC .... H04R 19/005; H04R 19/04; H04R 31/003; H04R 2201/003
See application file for complete search history.

(56) References Cited

U.S. PATENT DOCUMENTS

| | | | | |
|---|---|---|---|---|
| 9,380,380 | B2 * | 6/2016 | Kasai | H04R 19/005 |
| 9,958,315 | B2 * | 5/2018 | Inoue | H04R 19/005 |
| 2019/0349687 | A1 * | 11/2019 | Murakami | B81B 3/0072 |

* cited by examiner

*Primary Examiner* — Brian Ensey
(74) *Attorney, Agent, or Firm* — W&G Law Group

(57) ABSTRACT

The present invention provides a diaphragm and a MEMS sensor using the diaphragm. The diaphragm is a rectangular diaphragm, and the diaphragm includes a main body of the diaphragm and fixed parts arranged outside the main body of the diaphragm and located at the four corners of the diaphragm. The four corners of the rectangular diaphragm are depressed parts formed by concave in the direction of the diaphragm main body. The fixed part includes at least two fixed anchor points arranged along the edge of the diaphragm forming the depressed part. The present invention improves the effective sensing area of the diaphragm and the acoustic performance of the MEMS sensor.

8 Claims, 4 Drawing Sheets

DIAPHRAGM AND MEMS SENSOR USING SAME

FIELD OF THE PRESENT DISCLOSURE

The present invention relates to a diaphragm and a MEMS sensor using the diaphragm, especially to a fixed structure of the diaphragm.

DESCRIPTION OF RELATED ART

With the development of wireless communication, users have higher and higher requirements on the call quality of mobile phones. The microphone is used as the voice pickup device of the mobile phone, and its design directly affects the call quality of the mobile phone.

The microphone in mobile phones is the MEMS microphone. A MEMS sensor related to the present invention includes a basement and a capacitive system composed of a diaphragm and a back plate. The diaphragm and the back plate are opposite and spaced apart. The diaphragm vibrates under the action of sound waves, resulting in a change in the distance between the diaphragm and the back plate. In turn, the capacity of the capacitive system is changed, thereby converting the acoustic signal into an electric signal. However, due to the fixing method of the diaphragm, the entire outer part of the diaphragm is generally attached to the basement and fixed. In this way, the sensing area of the diaphragm is sacrificed, resulting in a lower acoustic performance of the MEMS sensor.

Therefore, it is necessary to provide a new diaphragm and a MEMS sensor using the diaphragm to solve the above technical problems.

SUMMARY OF THE PRESENT INVENTION

The present invention is to provide a diaphragm that increases the area of the effective sensing area.

The present invention provides a diaphragm, including: a diaphragm main body; and a plurality of fixed parts arranged at corners of the diaphragm main body. Corners of the diaphragm are depressed parts formed by concave in a direction of the diaphragm main body. The fixed part includes at least two fixed anchor points arranged along an edge of the diaphragm for forming the depressed part.

Further, the diaphragm includes two fixed anchor points symmetrically arranged at both ends of the edge where the diaphragm forms the depressed part.

Further, a depth of the depressed part of each corner position along a diagonal of the diaphragm does not exceed 10% of a diagonal length of the diaphragm.

Further, a number of the fixed anchor points is greater than two; the fixed anchor point extends from the edge for forming the depressed part along the diaphragm to a straight edge of the diaphragm.

Further, the diaphragm includes an arc corrugated part disposed behind the depressed part.

Further, the corrugated part includes a plurality of concentric arc protruded parts arranged at equal intervals.

The present invention further provides a MEMS sensor, including: a diaphragm as described above; a basement having a cavity for supporting the diaphragm; and a back plate opposite to and spaced from the diaphragm.

Further, the back plate includes a backplane main body and a support part extending from the backplane main body for being fixed on the basement.

Compared with the related art, the present invention provides a diaphragm for the MEMS sensor, and the diaphragm is a rectangular diaphragm. The diaphragm includes a diaphragm main body and fixed parts disposed outside the diaphragm main body and located at four corners of the diaphragm. The four corners of the rectangular diaphragm are depressed parts formed by concave in the direction of the diaphragm main body. The fixed part includes at least two fixed anchor points arranged along the edge of the diaphragm forming the depressed part. The present invention is mainly by setting fixed anchor points outside the diaphragm main body of the diaphragm, and the entire diaphragm is fixed by the fixed anchor points. In order to increase the effective sensing area of diaphragm, so as to achieve the purpose of improving the MEMS sensor's acoustic performance.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

Figure 1:
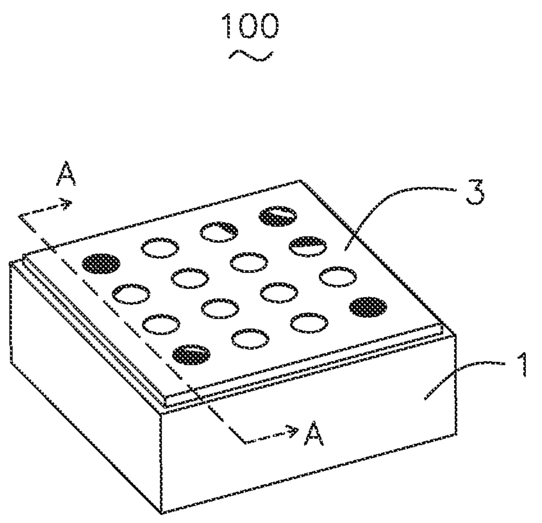
FIG. 1 is an isometric view of a MEMS sensor in accordance with an exemplary embodiment of the present invention.
Figure 2:
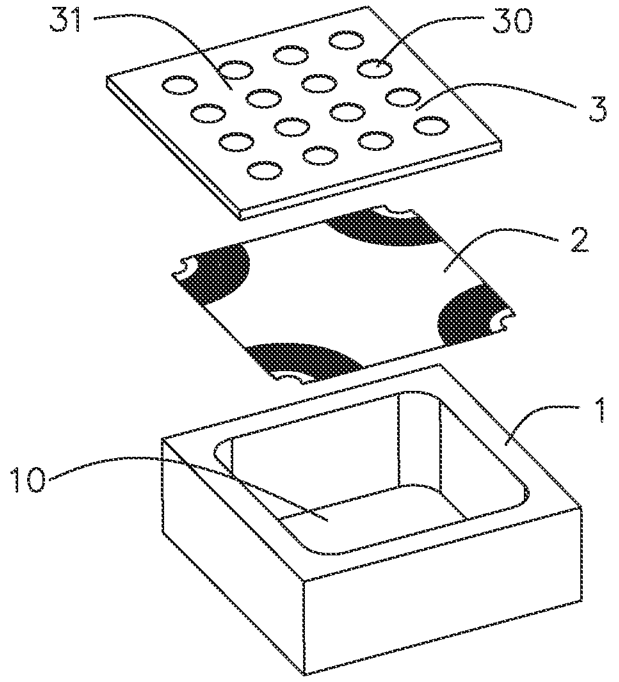
FIG. 2 is an exploded view of the MEMS sensor in FIG. 1.
Figure 3:
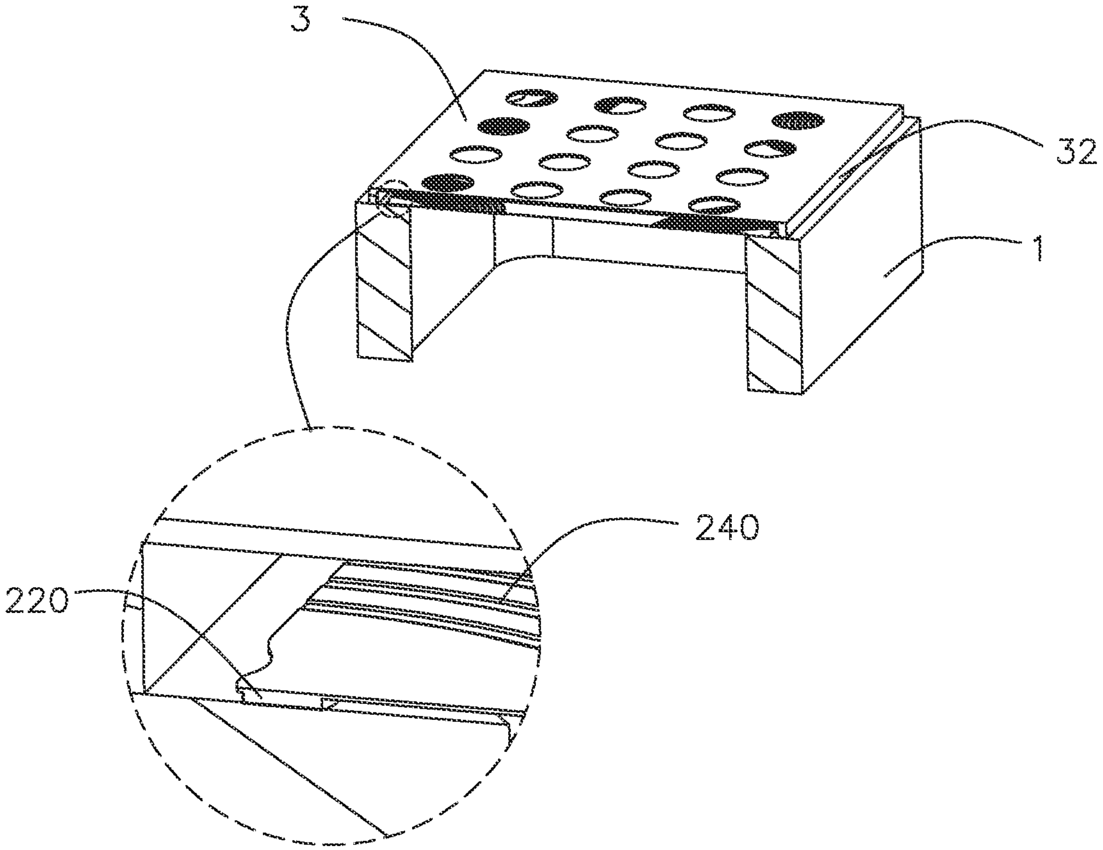
FIG. 3 is a cross-sectional view taken along line AA in FIG. 1.

The present disclosure will hereinafter be described in detail with reference to exemplary embodiments. To make the technical problems to be solved, technical solutions and beneficial effects of the present disclosure more apparent, the present disclosure is described in further detail together with the figures and the embodiments. It should be understood the specific embodiments described hereby are only to explain the disclosure, not intended to limit the disclosure.

It should be noted that, all directional indications (such as up, down, left, right, front, back, inner, outer, top, bottom . . . ) in the embodiment of the present invention are only used to explain the relative positional relationship between the various components shown in the attached figure), etc., if the specific posture changes, the directional indication also changes accordingly.

It should also be noted that when an element is referred to as being "fixed to" or "disposed on" other element, it can be directly on other element or intervening elements may also be present. When an element is referred to as being "connected" to the other element, it can be directly connected to the other element or intervening elements may also be present.

Please refer to FIGS. 1-5, a MEMS sensor 100 provided by the present invention can be used in electronic equipment. The mems sensor 100 includes a basement 1 with a cavity 10, a diaphragm 2 fixed on the basement 1, and a back plate 3 covering the diaphragm 2.

The cavity 10 is set throughout the basement 1.

Figure 4:
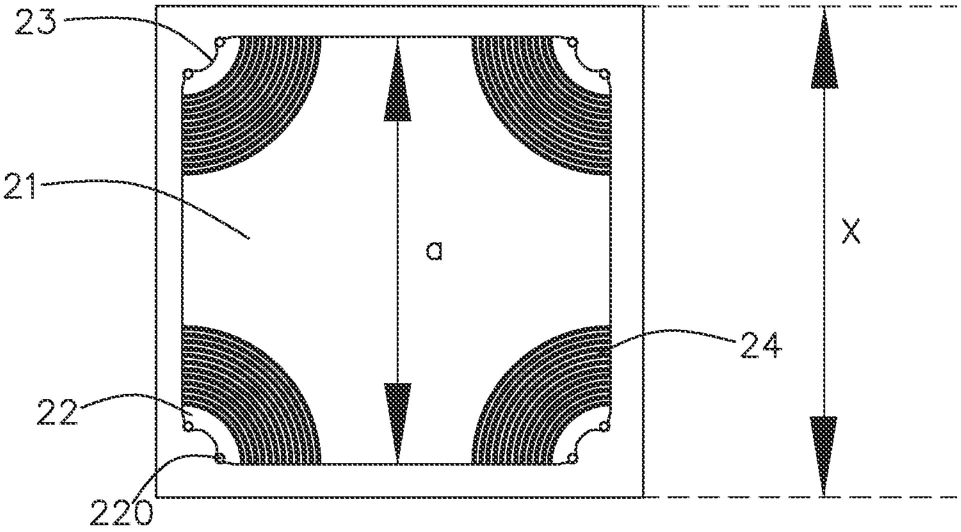
FIG. 4 is a top view of the MEMS sensor in FIG. 1.
Figure 5:
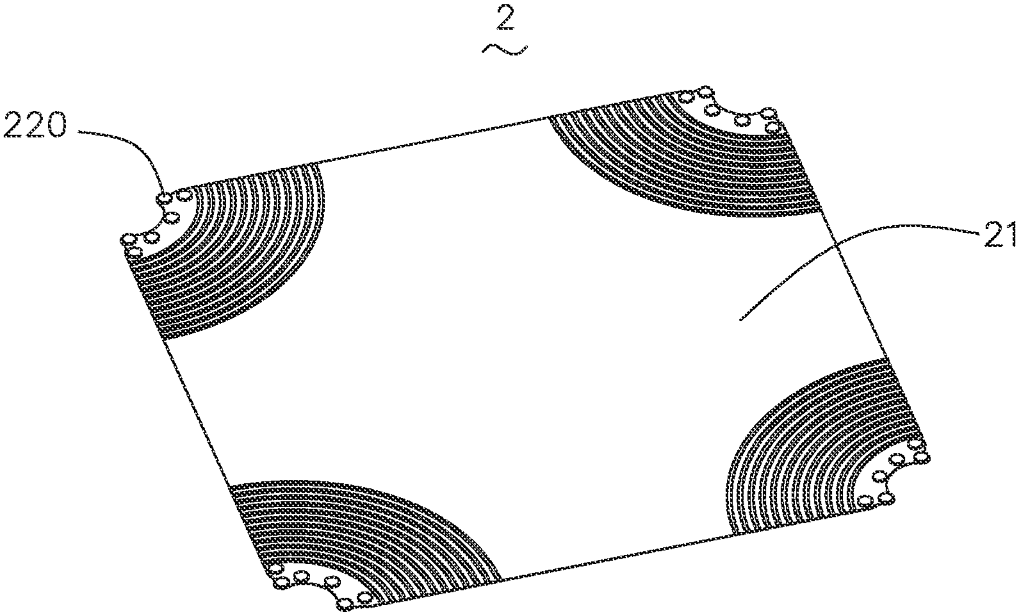
FIG. 5 is an isometric view of a diaphragm of a MEMS in accordance with another exemplary embodiment of the present invention.

The diaphragm 2 is a rectangular diaphragm, and the diaphragm 2 includes a diaphragm main body 21 and fixed parts 22 disposed outside the diaphragm main body 21 and located at four corners of the diaphragm 2. The four corners of the rectangular diaphragm are recessed in the direction of the diaphragm main body 21 to form depressed parts 23. The fixed part 22 includes at least two fixed anchor points 220 disposed along the edge of the diaphragm 2 forming the depressed part 23. As shown in FIG. 4, the number of fixed anchor points 220 for each corner position in the embodiment may be two. The fixed anchor points 220 are symmetrically arranged at both ends of the edge of the diaphragm 2 forming the depressed part 23. Of course, the number of the fixed anchor points 220 may also be greater than two. As shown in FIG. 5, the fixed anchor points 220 of each corner position extend from the edge that forms the depressed part 23 along the diaphragm 2 to the straight edge of the rectangular diaphragm. In the embodiment shown in FIG. 4, the number of fixed anchor points 220 of the entire diaphragm 2 is 6. In other embodiments, the number, size and distribution of fixed anchor points can be adjusted according to actual needs, such as different diaphragm stiffness requirements.

The depressed part 23 of each corner position along the diagonal of the diaphragm does not exceed 1/10 of the diagonal length of the rectangular diaphragm. The diaphragm 2 includes an arc corrugated part 24 arranged behind the depressed part 23. The corrugated part 24 consists of several concentric arc protruded parts 240 arranged at equal intervals. The fixed anchor point 220 extends from the edge forming the depressed part 23 along the diaphragm 2 to the straight edge of the rectangular diaphragm and does not extend to the corrugated part 24.

Figure 6:
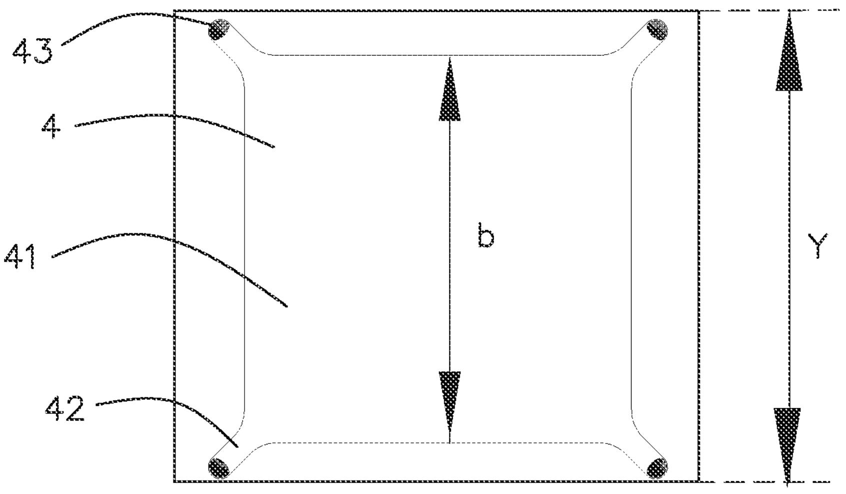
Fig.6 (Related Art)
FIG. 6 is a top view of a related sensor.
Figure 7:
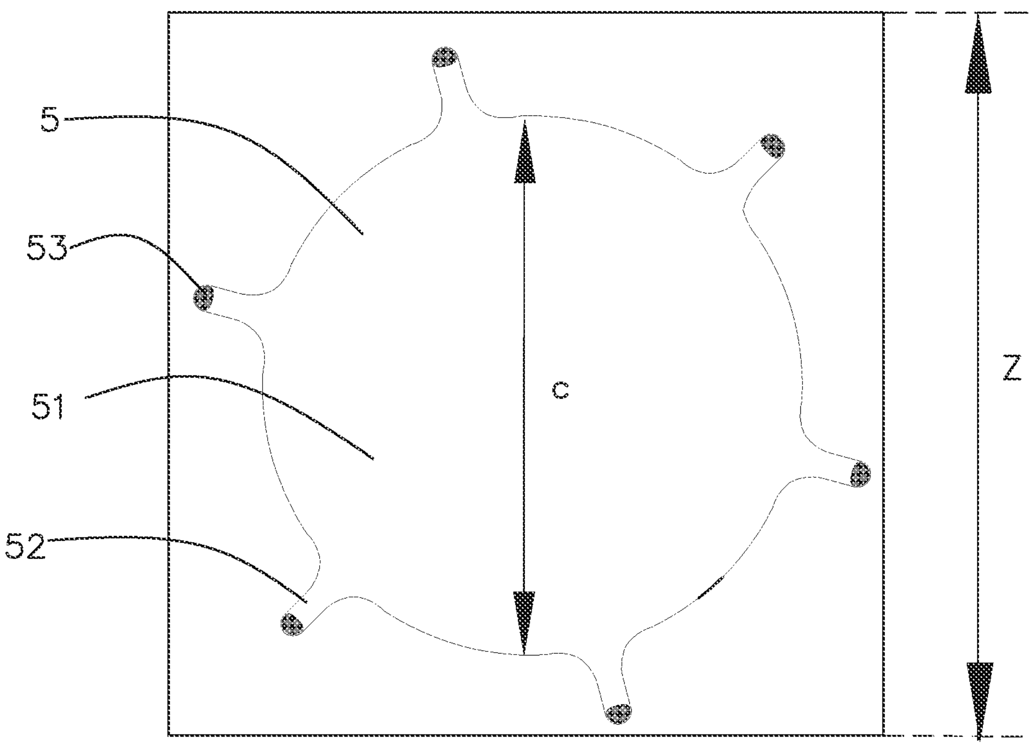
Fig.7 (Related Art)
FIG. 7 is a top view of another related sensor.

As shown in FIG. 4, if the sensor of the present invention is set as a square with an overall size of 1 mm×1 mm, for example, its edge length x is 1 mm, since the diaphragm of the present invention is fixed by setting the depressed part and the fixed anchor point, the effective sensing area a of the diaphragm can reach 68% of the entire area of the diaphragm. The diaphragms in the prior art as an example, please refer to FIG. 6, which is a top view of the basement and the diaphragm in the first prior art sensor. A sensor includes a diaphragm 4. The diaphragm 4 is also a square diaphragm, and the overall sensor edge length is y. The diaphragm 4 includes a main body 41, a number of extension parts 42 arranged outside the main body 41 and arranged at four corner positions of the diaphragm, a fixed part 43 set in the extension part 42 end part. The sensor is set to an overall size of 1 mm×1 mm, that is, the edge length y is 1 mm, the effective sensing area b of its diaphragm can only reach 45% of the entire diaphragm area. Please refer to FIG. 7, which is the top view of the basement and the diaphragm in the second sensor of the prior art. The diaphragm 5 is a circular diaphragm, the sensor is a square, and the edge length is z. The diaphragm 5 includes a main body 51, a number of extension parts 52 extending outside the main body 51, a fixed part 53 set in the end part of the extension part 52. The sensor is set to an overall size of 1 mm×1 mm, that is, the edge length z of the outer frame is 1 mm, the effective sensing area c of its diaphragm can only reach 44% of the entire area of the diaphragm.

It can be seen from the above that the present invention can utilize the effective sensing area of the diaphragm to the greatest extent, thereby improving the sensitivity of the sensor.

The back plate 3 is provided with a plurality of through holes 30 penetrating the back plate 3. The back plate 3 includes a backplane main body 31 and a support part 32 that is bent and extended from the backplane main body 31 and fixed to the basement 1. The backplane main body 31 and the support part 32 are surrounded by a containment space. The diaphragm 2 is accommodated in the containment space.

Compared with the related art, the present invention provides a diaphragm for the MEMS sensor, and the diaphragm is a rectangular diaphragm. The diaphragm includes a diaphragm main body and fixed parts disposed outside the diaphragm main body and located at four corners of the diaphragm. The four corners of the rectangular diaphragm are depressed parts formed by concave in the direction of the diaphragm main body. The fixed part includes at least two fixed anchor points arranged along the edge of the diaphragm forming the depressed part. The present invention mainly increases the effective sensing area of the diaphragm by setting fixed anchor points outside the diaphragm main body of the diaphragm, and the entire diaphragm is fixed by the fixed anchor points, thereby achieving the purpose of improving the MEMS sensor's acoustic performance.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A diaphragm, including:

a diaphragm main body;

a plurality of fixed parts arranged at corners of the diaphragm main body; wherein corners of the diaphragm are depressed parts formed by concave in a direction of the diaphragm main body; the fixed part includes at least two fixed anchor points arranged along an edge of the diaphragm for forming the depressed part.

2. The diaphragm as described in claim 1, including two fixed anchor points symmetrically arranged at both ends of the edge where the diaphragm forms the depressed part.

3. The diaphragm as described in claim 1, wherein a depth of the depressed part of each corner position along a diagonal of the diaphragm does not exceed 10% of a diagonal length of the diaphragm.

4. The diaphragm as described in claim 1, wherein a number of the fixed anchor points is greater than two; the fixed anchor point extends from the edge for forming the depressed part along the diaphragm to a straight edge of the diaphragm.

5. The diaphragm as described in claim 1, including an arc corrugated part disposed behind the depressed part.

6. The diaphragm as described in claim 5, wherein the corrugated part includes a plurality of concentric arc protruded parts arranged at equal intervals.

7. A MEMS sensor, including:

a diaphragm as described in claim 1;

a basement having a cavity for supporting the diaphragm;

and a back plate opposite to and spaced from the diaphragm.

8. The MEMS sensor as described in claim 7, wherein the back plate includes a backplane main body and a support part extending from the backplane main body for being fixed on the basement.

* * * * *